United States Patent
Tohta

(10) Patent No.: US 10,801,614 B2
(45) Date of Patent: Oct. 13, 2020

(54) LOCK-UP CLUTCH CONTROL METHOD FOR VEHICLE, AND LOCK-UP CLUTCH CONTROL DEVICE FOR VEHICLE

(71) Applicant: Nissan Motor Co., Ltd., Yokohama-shi, Kanagawa (JP)

(72) Inventor: Yuzuru Tohta, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/633,629

(22) PCT Filed: Aug. 16, 2017

(86) PCT No.: PCT/JP2017/029454
§ 371 (c)(1),
(2) Date: Jan. 24, 2020

(87) PCT Pub. No.: WO2019/035187
PCT Pub. Date: Feb. 21, 2019

(65) Prior Publication Data
US 2020/0208740 A1    Jul. 2, 2020

(51) Int. Cl.
*F16H 61/02* (2006.01)
*F16H 61/14* (2006.01)
*F16H 61/68* (2006.01)

(52) U.S. Cl.
CPC ....... *F16H 61/143* (2013.01); *F16H 61/0204* (2013.01); *F16H 61/68* (2013.01); *F16H 2061/145* (2013.01)

(58) Field of Classification Search
None
See application file for complete search history.

(56) References Cited

U.S. PATENT DOCUMENTS

| | | | |
|---|---|---|---|
| 6,773,372 B2 | 8/2004 | Matsubara et al. | |
| 2002/0038174 A1* | 3/2002 | Koumura | F16H 61/143 701/51 |

(Continued)

FOREIGN PATENT DOCUMENTS

| | | |
|---|---|---|
| JP | 3-172666 A | 7/1991 |
| JP | 5-231530 A | 9/1993 |

(Continued)

*Primary Examiner* — Justin Holmes
(74) *Attorney, Agent, or Firm* — Global IP Counselors, LLP

(57) ABSTRACT

A vehicle lock-up clutch control method is performed in which an output of an engine is transmitted to an automatic transmission via a torque converter having a lock-up clutch. The method includes controlling a transmission torque capacity of the lock-up clutch such that a slip rotation speed of the lock-up clutch becomes zero after the lockup clutch is brought into a non-engaged state immediately after starting an accelerator operation, and when the accelerator operation is carried out during a fuel cut of the engine or in a state in which a road load and a driving force of the vehicle are balanced, and after completion of a downshift when the automatic transmission is downshifted while executing a slip control of the lock-up clutch from the non-engaged state to an engaged state during the accelerator operation.

8 Claims, 4 Drawing Sheets

(56) References Cited

U.S. PATENT DOCUMENTS

| | | | |
|---|---|---|---|
| 2002/0155922 A1* | 10/2002 | Okuwaki | F16H 59/72 477/98 |
| 2003/0109359 A1* | 6/2003 | Eguchi | B60K 6/485 477/174 |
| 2012/0103742 A1* | 5/2012 | Takei | F16H 61/143 192/3.29 |
| 2012/0142494 A1* | 6/2012 | Yamada | B60W 10/06 477/175 |
| 2014/0277976 A1* | 9/2014 | Mitsuyasu | F16H 63/46 701/67 |
| 2017/0120918 A1* | 5/2017 | Tohta | B60W 30/18072 |

FOREIGN PATENT DOCUMENTS

| | | |
|---|---|---|
| JP | 2004-162749 A | 6/2004 |
| JP | 2015-218891 A | 12/2015 |

\* cited by examiner

US 10,801,614 B2

LOCK-UP CLUTCH CONTROL METHOD FOR VEHICLE, AND LOCK-UP CLUTCH CONTROL DEVICE FOR VEHICLE

CROSS-REFERENCE TO RELATED APPLICATIONS

This application is a U.S. national stage application of International Application No. PCT/JP2017/029454, filed on Aug. 16, 2017.

BACKGROUND

Technical Field

The present invention relates to a vehicle lock-up clutch control method and a vehicle lock-up clutch control device.

Background Information

Japanese Laid-Open Patent Application No. 05-231530 (Patent Document 1) discloses a technique in which, when an accelerator pedal is depressed during an engine fuel cut, a lock-up clutch is temporarily released and re-engaged after a prescribed period of time has elapsed.

SUMMARY

However, in the above-described prior art, when an automatic transmission downshifts as an accelerator pedal is depressed, if the lock-up clutch engages before completion of the downshift, the engine rotation speed will be reduced by being dragged down to the turbine rotation speed. That is, in the above-described prior art, there is the problem that, immediately after the accelerator pedal is depressed, the driver will experience an unintended deteriorated sense of acceleration due to the decreased engine speed.

An object of the present invention is to provide a vehicle lock-up clutch control method and a vehicle lock-up clutch control device that can suppress this deteriorated sense of acceleration.

In the present invention, if the automatic transmission downshifts when a slip control of the lock-up clutch from a non-engaged state to an engaged state is performed during an accelerator operation, the transmission torque capacity of the lock-up clutch is controlled such that the slip rotation speed of the lock-up clutch becomes 0 after completion of the downshift.

Therefore, in the present invention, it is possible to suppress the deteriorated sense of acceleration.

DETAILED DESCRIPTION OF THE EMBODIMENTS

A preferred embodiments for carrying out a vehicle lock-up clutch control method and a vehicle lock-up clutch control device of the present invention is described below based on the drawings.

First Embodiment

Figure 1:
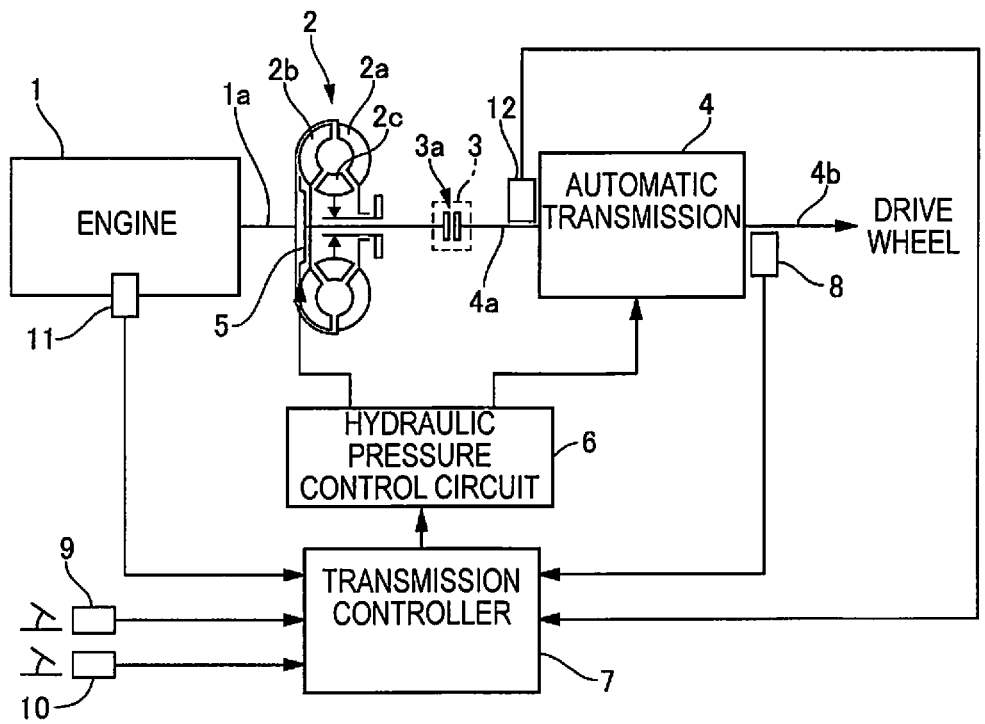
FIG. 1 is a system diagram illustrating a vehicle lock-up clutch control device according to a first embodiment.

FIG. 1 is a system diagram illustrating a vehicle lock-up clutch control device according to the first embodiment. The vehicle of the first embodiment comprises as a power train, an engine 1, a torque converter 2, a forward/reverse switching mechanism 3, and an automatic transmission 4. The rotation of the engine 1 is transmitted to the drive wheels, not shown, via the torque converter 2, the forward/reverse switching mechanism 3, and the automatic transmission 4.

The torque converter 2 includes a pump impeller 2a, a turbine runner 2b, and a stator 2c. The pump impeller 2a is connected to a crankshaft 1a of the engine 1. The turbine runner 2b is connected to an input shaft 4a of the automatic transmission 4. The stator 2c is arranged between the pump impeller 2a and the turbine runner 2b. When the pump impeller 2a rotates, there is a flow of hydraulic oil from the pump impeller 2a to the turbine runner 2b, and due to the reception of this flow by the turbine runner 2b, the turbine runner 2b rotates. The hydraulic oil that exits the turbine runner 2b is rectified by the stator 2c and returned to the pump impeller 2a again, thereby realizing a torque amplifying action.

The torque converter 2 has a lock-up clutch 5 that engages (mechanically directly connecting) the pump impeller 2a and the turbine runner 2b. The lock-up clutch 5 is actuated in response to a pressure differential PA-PR between a torque converter apply pressure PA and a torque converter release pressure PR on both sides (input side, output side). If the pressure differential PA-PR is negative, the transmission torque capacity of the lock-up clutch 5 is 0 [Nm], and the lock-up clutch 5 is released. If the pressure differential PA-PR is positive, the transmission torque capacity of the lock-up clutch 5 increases as the pressure differential PA-PR increases. The forward/reverse switching mechanism 3 has a planetary gear mechanism and a plurality of clutches 3a and switches between forward and reverse in accordance with the engagement state of the clutches 3a.

The automatic transmission 4 is a belt-type continuously variable transmission that can change the gear ratio between the input shaft 4a and the output shaft 4b. The automatic transmission 4 comprises two pulleys, which can change the groove width, and a belt extending between the two pulleys. When the groove width of the pulleys is changed by means of hydraulic pressure, the contact radius between the belt and the pulleys changes, and the transmission ratio is changed. The hydraulic pressure used for changing the engagement state of the torque converter 2 and for shifting the automatic transmission 4 is supplied from a hydraulic pressure control circuit 6. The hydraulic pressure control circuit 6 has a plurality of valves and oil passages. The hydraulic pressure control circuit 6 adjusts the hydraulic pressure that is supplied to the torque converter 2 and the automatic transmission 4 based on a signal from a transmission controller (controller) 7 using the hydraulic pressure generated by a hydraulic pump, not shown, as the source pressure.

Signals from a vehicle speed sensor 8, an accelerator opening degree sensor 9, a brake switch 10, an engine rotation speed sensor 11, and a turbine rotation speed sensor 12 are input to the transmission controller 7. The vehicle speed sensor 8 detects the vehicle speed (rotary speed of the output shaft 4b of the automatic transmission 4). The accelerator opening degree sensor 9 detects the opening degree of the accelerator pedal (accelerator opening degree). The brake switch 10 detects the presence/absence of an operation of the brake pedal. The engine rotation speed sensor 11 detects the rotary speed of the engine 1. The turbine rotation speed sensor 12 detects the rotary speed of the turbine runner 2b. The transmission controller 7 determines the transmission ratio of the automatic transmission 4 and the engagement state of the lock-up clutch 5 required in accordance with the driving state based on each input signal, and outputs a signal to the hydraulic pressure control circuit 6 such that these requirements are realized.

The control of the lock-up clutch 5 by the transmission controller 7 will be described below. The transmission controller 7 starts from a vehicle stopped state, releases the lock-up clutch 5 until the vehicle reaches a prescribed vehicle speed, and secures starting torque by utilizing the torque amplification action of the torque converter 2. In order to improve fuel efficiency, when the vehicle reaches the prescribed vehicle speed after starting, the transmission controller 7 engages the lock-up clutch 5. At this time, the transmission controller 7 carries out slip control of the lock-up clutch 5 from the released state to the engaged state for the purpose of suppressing engagement shock. When the driver releases the accelerator pedal from a drive state in which the lock-up clutch 5 is engaged, the vehicle transitions to a coasting state. The transmission controller 7 maintains the engaged state of the lock-up clutch 5 during coasting, and releases the lock-up clutch 5, thereby preventing engine stall, when the vehicle speed decreases and the engine speed approaches idle speed.

When a fuel cut of the engine 1 is performed by a not-shown engine controller during coasting, the transmission controller 7 engages the lock-up clutch 5. Because the drive wheels keep the engine speed above idle speed, when fuel injection resumes, the driving force of the engine 1 can be immediately recovered without driving a starter motor. When the vehicle speed subsequently decreases and the engine speed approaches idle speed, the engine controller ends the fuel cut of the engine 1. The transmission controller 7 releases the lock-up clutch 5. Thus, it is possible to prevent an engine stall due to the engine speed being pushed down below the idling speed by the drive wheels. The engine 1 enters an idling state by resuming fuel injection.

When the driver depresses the accelerator pedal-(accelerator ON) from a state in which fuel cut is being carried out during coasting (coast lock-up state), the engine controller ends the fuel cut of the engine 1 and resumes fuel injection. When the accelerator pedal is depressed, the transmission controller 7 releases the lock-up clutch 5. As a result, it is possible to suppress an occurrence of shock that accompanies a rise in engine torque due to resuming fuel injection. When changes in the accelerator opening degree cease, or after a prescribed period of time has elapsed after releasing the lock-up clutch 5, the transmission controller 7 engages the lock-up clutch 5 for the purpose of improving fuel efficiency. At this time, the transmission controller 7 carries out slip control of the lock-up clutch 5 from the released state to the engaged state, for the purpose of suppressing engagement shock.

During slip control, the transmission controller 7 calculates a target slip rotation speed of the lock-up clutch 5, calculates a lock-up command pressure, which is a target value of the pressure differential PA-PR of the lock-up clutch 5, such that the actual slip rotation speed follows the target slip rotation speed, and outputs the command pressure to the hydraulic pressure control circuit 6. The lock-up instruction value is a command value for the transmission torque capacity of the lock-up clutch 5. The slip rotation speed is the input/output differential rotation speed of the lock-up clutch 5, and is a value obtained by subtracting the rotation speed of the turbine runner 2b from the rotation speed of the pump impeller 2a. The transmission controller 7 determines the lock-up command pressure in accordance with the target slip rotation speed, the actual slip rotation speed, and the engine torque. Here, when the lock-up clutch 5 is released by means of accelerator ON from the coast lock-up state described above and then re-engaged by means of slip control, the automatic transmission 4 is downshifted during the slip control depending on the accelerator opening degree. In this case, if the lock-up clutch 5 engages before the completion of the downshift, the engine rotation speed is dragged down by the turbine rotation speed, which may cause a deterioration of the sense of acceleration. Therefore, in the transmission controller 7 according to the first embodiment, if the automatic transmission 4 is downshifted during slip control, the lock-up clutch 5 engages after completion of the downshift in order to suppress the deterioration in the sense of acceleration.

Figure 2:
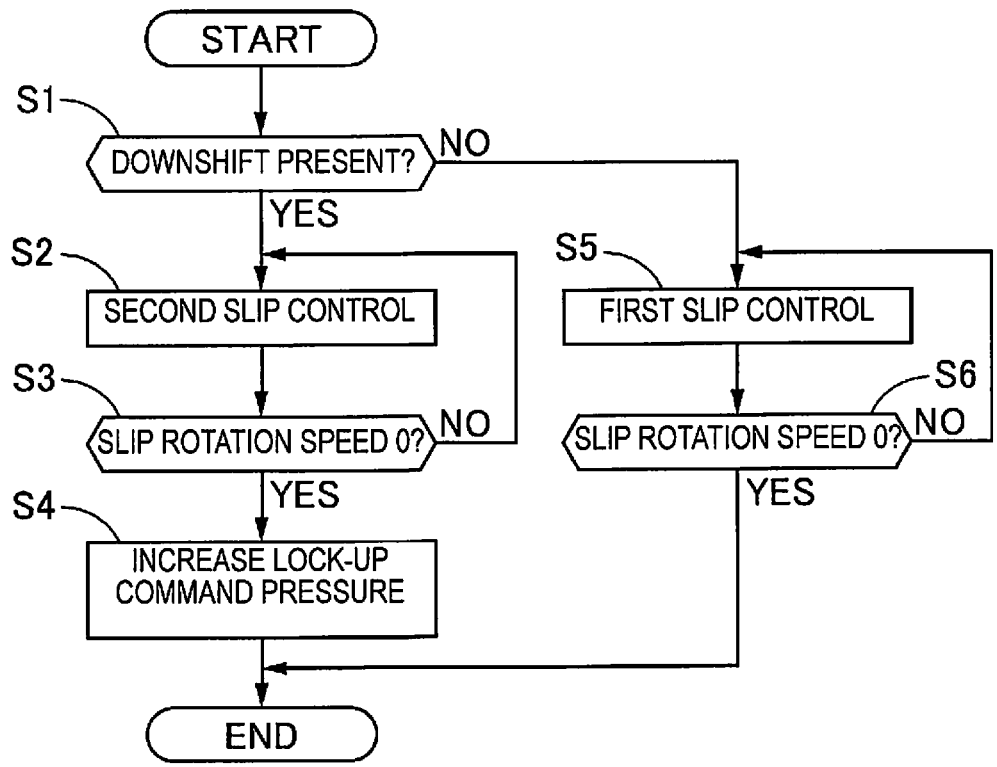
FIG. 2 is a flowchart illustrating a slip control flow executed by a transmission controller 7 of the first embodiment.

FIG. 2 is a flowchart illustrating a slip control process that is executed by the transmission controller 7 of the first embodiment. This control is initiated by means of accelerator ON from the coast lock-up state.

In Step S1, it is determined whether the automatic transmission 4 is downshifted. If YES, the process proceeds to Step S2, and if NO, the process proceeds to Step S5. Since the shifting of the automatic transmission 4 is determined by the vehicle speed and the accelerator opening degree, the presence/absence of the downshift can be determined from the vehicle speed and the accelerator opening degree.

Figure 3:
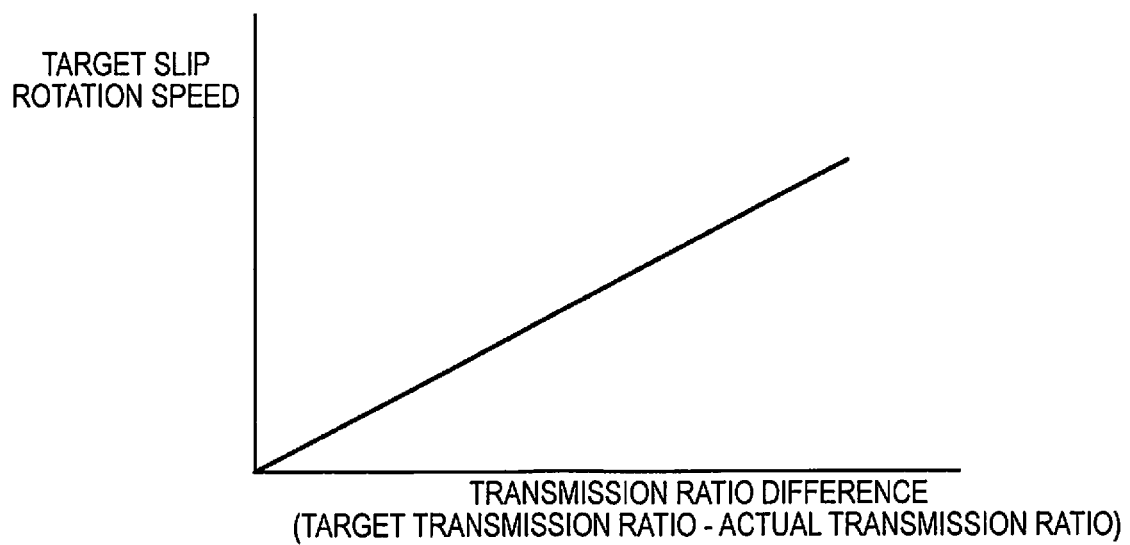
FIG. 3 is a map for setting a target slip rotation speed corresponding to a gear ratio difference.

In Step S2, a second slip control, which is slip control that corresponds to downshift, is executed. In the second slip control, first, the target slip rotation speed, which increases at a constant gradient is calculated, and the lock-up command pressure that achieves the target slip rotation speed is calculated. After the target slip rotation speed reaches a prescribed rotation speed, the target slip rotation speed is calculated with reference to the map shown in FIG. 3, based on the gear ratio difference (target gear ratio-actual gear ratio). The prescribed rotation speed is set to be a higher value as the engine torque increases. FIG. 3 is a setting map of the target slip rotation speed corresponding to gear ratio difference. In the map of FIG. 3, the target slip rotation speed is proportional to the gear ratio difference and becomes zero when the gear ratio difference is zero. The lock-up command pressure is set to a value such that the gradient of the engine rotation speed does not become smaller than a prescribed gradient (negative), while causing the actual slip rotation speed to follow the target slip rotation speed. The prescribed gradient is set, for example, to the maximum value of the decrease gradient of the engine rotation speed at which the driver does not experience a deteriorated sense of acceleration.

In Step S3, it is determined whether the slip rotation speed is 0 (rpm). If YES, the process proceeds to Step S4, and if NO, the process returns to Step S2.

In Step S4, the lock-up command pressure is set to a lock-up command pressure corresponding to the accelerator opening degree.

In Step S5, a first slip control, which is slip control that corresponds to non-downshift, is executed. In the first slip control, first, the target slip rotation speed, which increases at a constant gradient is calculated, and the lock-up command pressure that achieves the target slip rotation speed is calculated. After the target slip rotation speed reaches a prescribed rotation speed, the target slip rotation speed is decreased at a constant gradient such that the target slip rotation speed becomes 0 (rpm) after a prescribed period of time. The prescribed rotation speed is set to a higher value as the engine torque increases. The decrease gradient of the target slip rotation speed becomes greater than the decrease gradient of the target slip rotation speed after the target slip rotation speed reaches the prescribed rotation speed in the second slip control.

In Step S6, it is determined whether the slip rotation speed is 0 (rpm). If YES, the present control is ended, and if NO, the process returns to Step S5.

Figure 4:
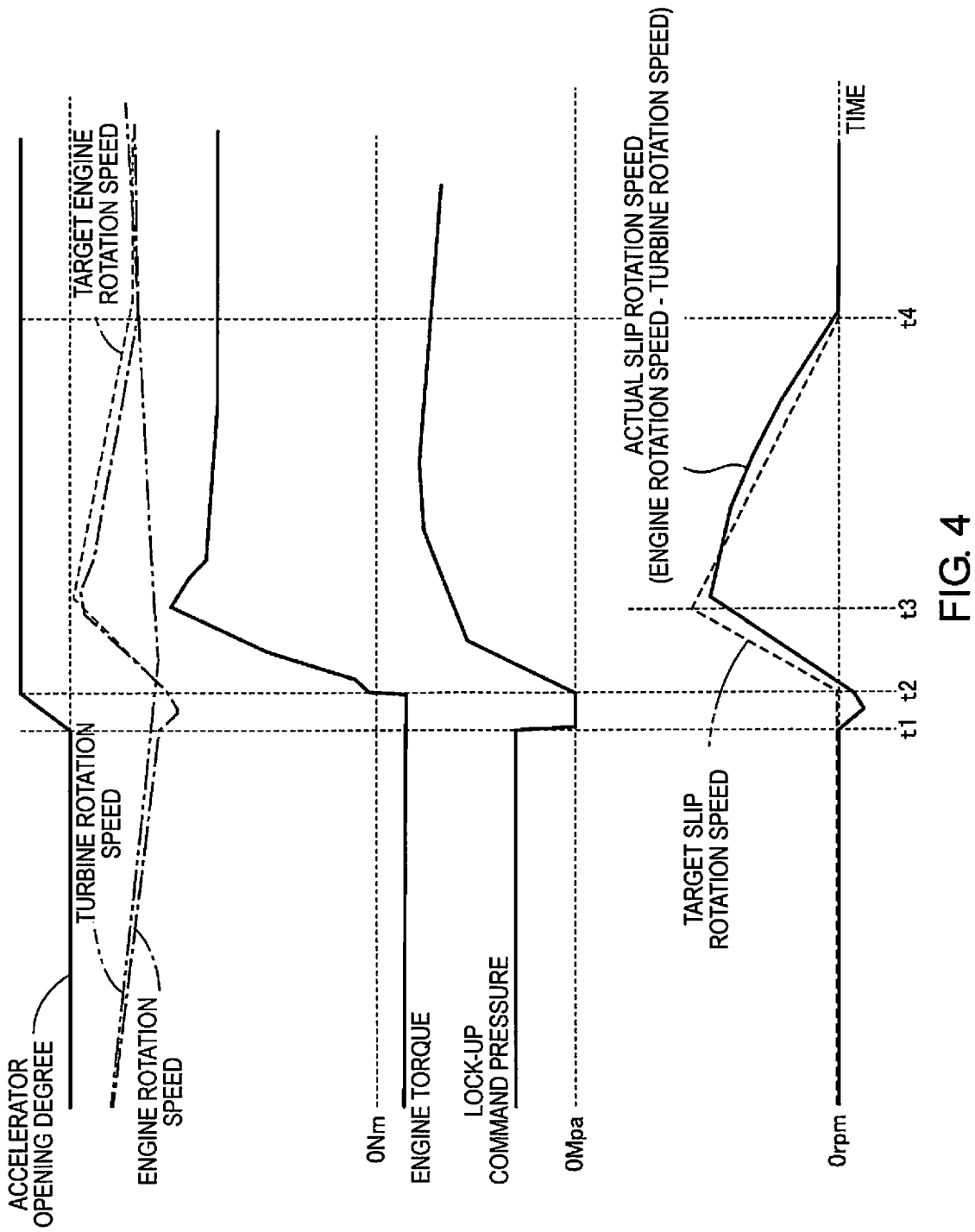
FIG. 4 is a time chart illustrating an operation of the slip control of the first embodiment in the case that an automatic transmission is not downshifted, when a lock-up clutch is disengaged and then re-engaged, by means of accelerator ON from a coasting lock-up state.
Figure 5:
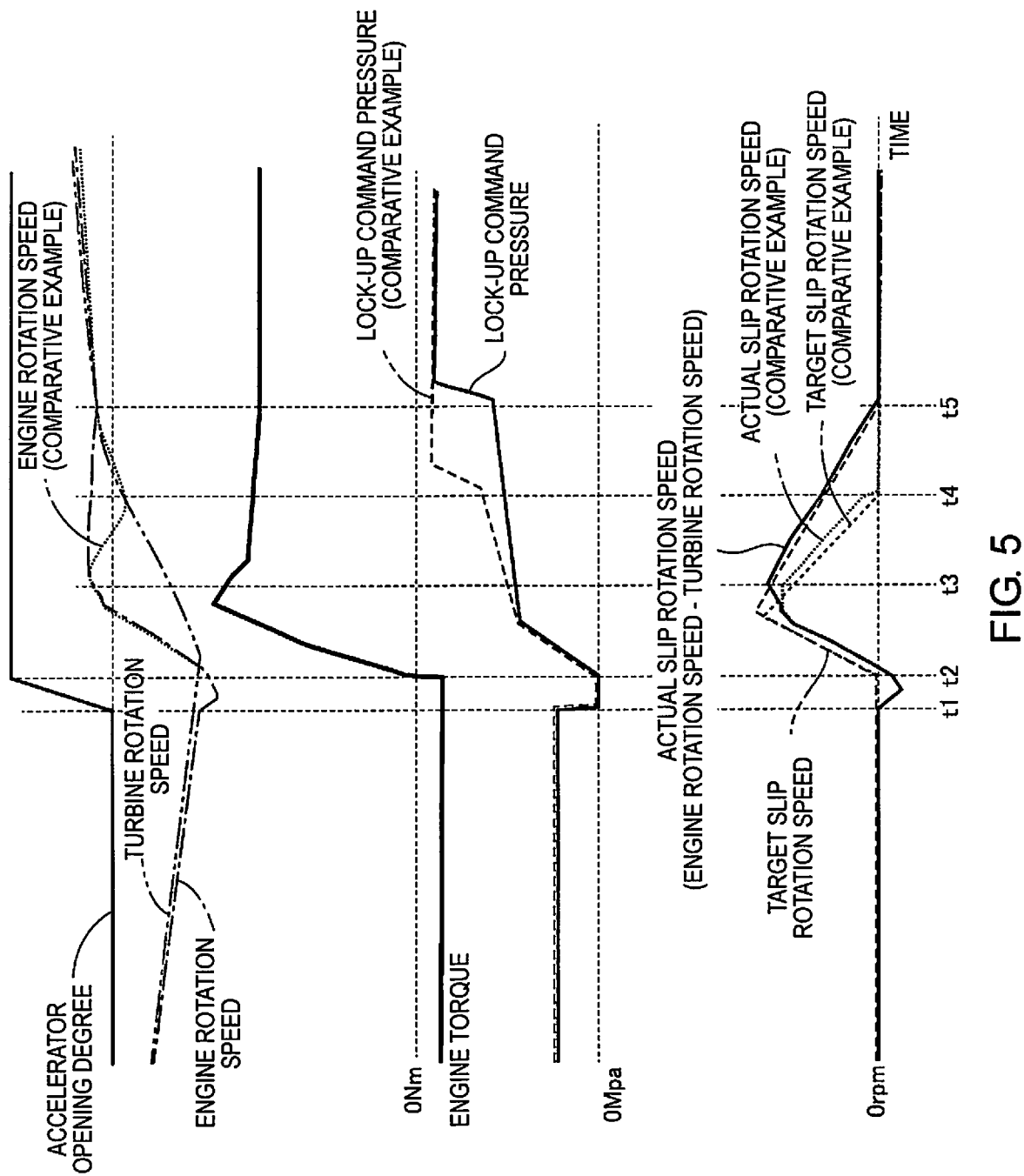
FIG. 5 is a time chart illustrating a slip control operation of the first embodiment when the automatic transmission is downshifted when the lock-up clutch is disengaged and then re-engaged by means of accelerator ON from the coasting lock-up state.

FIGS. 4 and 5 are time charts illustrating the operation of the slip control of the first embodiment, when the lock-up clutch 5 is disengaged and then re-engaged, by means of accelerator ON from the coasting lock-up state. FIG. 4 is a case in which the automatic transmission 4 is not downshifted, and FIG. 5 is a case in which the automatic transmission 4 is downshifted.

First, the time chart of FIG. 4 will be described.

At time t1, since the driver starts to depress the accelerator pedal, the lock-up command pressure becomes 0 (Mpa), and the lock-up clutch 5 is released. As a result, it is possible to suppress an occurrence of shock that accompanies a rise in the engine torque.

At time t2, since the change in the accelerator opening degree has ceased, slip control for re-engaging the lock-up clutch 5 is initiated. Since the automatic transmission 4 is not downshifted, the first slip control is executed as the slip control. In the section from times t2 to t3, the target slip rotation speed increases at a constant gradient.

At time t3, since the target slip rotation speed has reached the prescribed rotation speed, the target slip rotation speed starts to decrease. In the section from times t3 to t4, the target slip rotation speed decreases at a constant gradient so as to become 0 (rpm) after a prescribed period of time has elapsed from time t3.

At time t4, the target slip rotation speed becomes 0 (rpm), and immediately thereafter the actual slip rotation speed becomes 0 (rpm), that is, the lock-up clutch 5 is engaged, so that the first slip control ends.

Next, the time chart of FIG. 5 will be described. As a comparative example, a case in which the first slip control is executed when the automatic transmission 4 is downshifted is indicated by a broken line as the comparative example.

The interval from times t1 to t2 is the same as in FIG. 4, but the accelerator opening degree is greater than in FIG. 4.

At time t2, since the change in the accelerator opening degree has ceased, slip control for re-engaging the lock-up clutch 5 is initiated. Since the automatic transmission 4 is downshifted because the accelerator opening degree is greatly changed compared with the case shown in FIG. 4, the second slip control is executed as the slip control. In the section from times t2 to t3, the target slip rotation speed increases with a constant gradient.

At time t3, since the target slip rotation speed has reached the prescribed rotation speed, the target slip rotation speed starts to decrease. In the comparative example, like the case of FIG. 4, in the section from times t3 to t4, the target slip rotation speed decreases at a constant gradient so as to become 0 (rpm) after a prescribed period of time has elapsed from time t3. Therefore, the lock-up command pressure increases in accordance with the decrease in the target slip rotation speed, and the lock-up clutch 5 engages immediately after time t4. At this time, since the automatic transmission 4 is shifting, the lock-up command pressure is increased and the lock-up clutch 5 engages before the completion of the downshift; as a result, the engine rotation speed, which was rising in accordance with the depression of the accelerator pedal, is dragged down by the turbine rotation speed. The engine behavior immediately after accelerator ON and resulting phenomena (tachometer behavior, changes in the engine sound, etc.) are behaviors and phenomena that are contrary to the driver's intention, and thus are accompanied by a deteriorated sense of acceleration.

In contrast, in the second slip control of the first embodiment, in the interval from times t3 to t5, the target slip rotation speed decreases in accordance with the progress of the shifting (decrease in the gear ratio difference). Therefore, the target slip rotation speed becomes 0 (rpm) at the same time that the downshift is completed at time t5, and the lock-up clutch 5 is engaged. That is, in the second slip control, the transmission torque capacity of the lock-up clutch 5 is controlled such that the actual slip rotation speed of the lock-up clutch 5 becomes 0 (rpm), that is, the lock-up clutch 5 is engaged after completion of the downshift. Therefore, the lock-up clutch 5 is engaged after the turbine rotation speed rises to a rotation speed corresponding to the target gear ratio. As a result, since a decrease in the engine rotation speed during re-engagement of the lock-up clutch 5 accompanying a downshift of the automatic transmission 4 is suppressed, it is possible to suppress the deterioration of the sense of acceleration.

Additionally, in the second slip control, the lock-up command pressure is set to a value such that the gradient of the engine rotation speed does not become smaller than a prescribed gradient, and the increase gradient thereof becomes smaller than the case of the comparative example. Therefore, since the decrease gradient of the engine rotation speed when shifting the lock-up clutch 5 from a non-engaged state to an engaged state is limited, it is possible to suppress the deterioration of the sense of acceleration.

At time t5, the target slip rotation speed becomes 0 (rpm), and immediately thereafter the actual slip rotation speed becomes 0 (rpm), that is, the lock-up clutch 5 is engaged, so that the first slip control ends. The lock-up command pressure is increased to a value corresponding to the accelerator opening degree. As a result, it is possible to prevent the lock-up clutch 5 from slipping due to an insufficient transmission torque capacity of the lock-up clutch 5 with respect to an increase in the engine torque due to a downshift. As a result, it is possible to suppress the deterioration of the acceleration as well as the racing of the engine 1 after the lock-up clutch 5 is re-engaged.

The following effects are exhibited according to the first embodiment.

(1) A vehicle lock-up clutch control method, in which output of the engine 1 is transmitted to the automatic transmission 4 via the torque converter 2 having the lock-up clutch 5, comprising: controlling a transmission torque capacity of the lock-up clutch 5 such that the slip rotation speed of the lock-up clutch 5 becomes 0 (rpm) after completion of the downshift when the automatic transmission 4 is downshifted while executing out slip control of the lock-up clutch 5 from a non-engaged state to an engaged state during an accelerator operation. As a result, since a decrease in the engine rotation speed during re-engagement of the lock-up clutch 5 accompanying a downshift of the automatic transmission 4 is suppressed, it is possible to suppress the deterioration of the sense of acceleration.

(2) The transmission torque capacity of the lock-up clutch 5 is controlled such that the gradient of the changes in the engine rotation speed becomes larger than a prescribed gradient during slip control. As a result, since the decrease gradient of the engine rotation speed when the lock-up clutch 5 is re-engaged is limited, it is possible to suppress deterioration of the sense of acceleration.

(3) When an accelerator operation is carried out during fuel cut of the engine 1, the slip control is executed after the lock-up clutch 5 is brought into a non-engaged state. As a result, it is possible to suppress the deterioration of the sense of acceleration accompanying re-engagement of the lock-up clutch 5, while suppressing engagement shock of the lock-up clutch 5 at the time of re-acceleration.

(4) The transmission torque capacity in the engaged state of the lock-up clutch 5 is changed in accordance with the presence/absence of downshift. Specifically, the transmission torque capacity in the engaged state of the lock-up clutch 5 is set to be greater when there is a downshift compared to when there is no downshift. As a result, it is possible to suppress a deterioration in the acceleration as well as the racing of the engine 1 accompanying slipping of the lock-up clutch 5 with respect to an increase in the engine torque after a downshift.

(5) The transmission torque capacity during slip control is calculated in accordance with the target slip rotation speed of the lock-up clutch 5, and the target slip rotation speed is changed in accordance with the presence/absence of a downshift. Specifically, the increase gradient of the transmission torque capacity is set to be smaller when there is a downshift, compared to when there is no downshift. As a result, it is possible to suppress the deterioration of the sense of acceleration, regardless of the presence/absence of downshift.

(6) In the case that the automatic transmission 4 is downshifted, the target slip rotation speed of the lock-up clutch 5 is set to 0 (rpm) at the time of the end of the downshift. As a result, it is possible the engagement of the lock-up clutch 5 before the completion of the downshift.

(7) A torque converter 2 that has a lock-up clutch 5 and that transmits the output of the engine 1 to the automatic transmission 4, and a transmission controller 7 that controls the transmission torque capacity of the lock-up clutch 5 are provided, and if the automatic transmission 4 is downshifted when slip control of the lock-up clutch 5 from a non-engaged state to an engaged state is carried out during an accelerator operation, the transmission controller 7 controls the transmission torque capacity such that the slip rotation speed of the lock-up clutch 5 becomes 0 (rpm) after completion of the downshift. As a result, since a decrease in the engine rotation speed during re-engagement of the lock-up clutch 5 accompanying a downshift of the automatic transmission 4 is suppressed, it is possible to suppress the deterioration of the sense of acceleration.

Second Embodiment

The second embodiment differs from the first embodiment in that the lock-up command pressure is calculated in accordance with the accelerator opening degree. Since the other configurations are the same as those of the first embodiment, only the differing portions will be described.

In the flow chart of FIG. 2, in Step S2, the second slip control is executed, which is the slip control that corresponds to a downshift. In the second slip control, a lock-up command pressure is calculated such that the actual slip rotation speed decreases with time and becomes 0 (rpm) when there is a gear ratio difference of the automatic transmission 4 (target gear ratio-actual gear ratio). The lock-up command pressure is set to a value such that the gradient of the engine rotation speed does not become smaller than a prescribed gradient (negative). The prescribed gradient is set, for example, to the maximum value of the decrease gradient of the engine rotation speed at which the driver does not experience a deterioration in the sense of acceleration.

In Step S5, the first slip control is executed, which is slip control that corresponds to a non-downshift. In the first slip control, the lock-up command pressure is increased such that the actual slip rotation speed decreases with time and becomes 0 (rpm) after a prescribed period of time. The lock-up command pressure increases as the accelerator opening degree increases. In addition, the increase gradient of the lock-up command pressure becomes greater than the increase gradient of the lock-up command pressure in the second slip control.

In the second slip control of the second embodiment, as in the case of the first embodiment, the transmission torque capacity of the lock-up clutch 5 is controlled such that the lock-up clutch 5 is engaged after completion of the downshift. As a result, since a decrease in the engine rotation speed during re-engagement of the lock-up clutch 5 accompanying a downshift of the automatic transmission 4 is suppressed, it is possible to suppress deterioration of the sense of acceleration. In addition, in the second slip control, since the decrease gradient of the engine rotation speed is limited when the lock-up clutch 5 is shifted from the non-engaged state to the engaged state, it is possible to suppress the deterioration of the sense of acceleration.

The following effects are exhibited according to the second embodiment.

(8) The transmission torque capacity during slip control is calculated in accordance with the accelerator opening degree, and the transmission torque capacity is changed in accordance with the presence/absence of a downshift. Specifically, the increase gradient of the transmission torque capacity is set to be smaller when there is a downshift, compared to when there is no downshift. As a result, it is possible to suppress the deterioration of the sense of acceleration, regardless of the presence/absence of downshifting.

(9) In the case that the automatic transmission 4 is downshifted, the lock-up command pressure, which is the command value of the transmission torque capacity, is set such that the target slip rotation speed of the lock-up clutch 5 becomes 0 (rpm) at the time of the end of the downshift. As a result, it is possible to avoid a situation in which the lock-up clutch 5 is engaged before the completion of the downshift.

Other Embodiments

Implementation forms of the present invention were described above based on the foregoing embodiments, but specific configurations of the present invention are not limited by these embodiments, and modifications that can be made without departing from the scope of the invention are also included in the present invention.

The slip control of the present invention can be applied to slip control when starting a vehicle, or to slip control when the accelerator pedal is depressed from a state in which the road load and the driving force of the vehicle are balanced (constant speed travel, etc.), and achieve the same action and effects of the present embodiment.

The method for calculating the lock-up command pressure in the slip control is arbitrary, and it is sufficient at least as long as the slip rotation speed of the lock-up clutch becomes zero after completion of the downshift. For example, in the first embodiment, when the lock-up command pressure is calculated, a target engine rotation speed can be used instead of the target slip rotation speed. In this case, the target engine rotation speed is set to 0 (rpm) at the timing of the end of the downshift.

The invention claimed is:

1. A vehicle lock-up clutch control method in which an output of an engine is transmitted to an automatic transmission via a torque converter having a lock-up clutch, the vehicle lock-up clutch control method comprising:
controlling a transmission torque capacity of the lock-up clutch such that a slip rotation speed of the lock-up clutch becomes zero after the lockup clutch is brought into a non-engaged state immediately after starting an accelerator operation that is carried out during a fuel cut of the engine or in a state in which a road load and a driving force of the vehicle are balanced, and after completion of a downshift when the automatic transmission is downshifted while executing a slip control of the lock-up clutch from the non-engaged state to an engaged state during the accelerator operation.

2. The vehicle lock-up clutch control method according to claim 1, wherein
the transmission torque capacity is controlled such that the change gradient of the engine rotation speed becomes larger than a prescribed gradient during the slip control.

3. The vehicle lock-up clutch control method according to claim 1, wherein
the transmission torque capacity in the engaged state of the lock-up clutch is changed in accordance with a presence or an absence of the downshift.

4. The vehicle lock-up clutch control method according to claim 1, wherein
the transmission torque capacity during the slip control is calculated in accordance with a target slip rotation speed or a target engine rotation speed of the lock-up clutch, and the target slip rotation speed or the target engine rotation speed is changed in accordance with a presence or an absence of the downshift.

5. The vehicle lock-up clutch control method according to claim 4, wherein
the target slip rotation speed or the target engine rotation speed is set to zero at a time of the completion of the downshift in a case that the automatic transmission is downshifted.

6. The vehicle lock-up clutch control method according to claim 1, wherein
the transmission torque capacity during the slip control is calculated in accordance with an accelerator opening degree, and the transmission torque capacity is changed in accordance with a presence or an absence of the downshift.

7. The vehicle lock-up clutch control method according to claim 6, wherein
a command value of the transmission torque capacity is set such that the slip rotation speed of the lock-up clutch becomes zero at a time of the completion of the downshift in a case that the automatic transmission is downshifted.

8. A vehicle lock-up clutch control device, comprising
a torque converter that has a lock-up clutch and that transmits an output of an engine to an automatic transmission, and
a controller that controls a transmission torque capacity of the lock-up clutch,
wherein
the controller controls the transmission torque capacity such that the slip rotation speed of the lock-up clutch becomes zero after the lockup clutch is brought into a non-engaged state immediately after starting an accelerator operation that is carried out during a fuel cut of the engine or in a state in which a road load and a driving force of the vehicle are balanced, and after completion of a downshift when the automatic transmission is downshifted while executing a slip control of the lock-up clutch from the non-engaged state to an engaged state during the accelerator operation.

* * * * *